(12) United States Patent
Smith et al.

(10) Patent No.: US 6,366,318 B1
(45) Date of Patent: Apr. 2, 2002

(54) CFA CORRECTION FOR CFA IMAGES CAPTURED AT PARTIAL RESOLUTION

(75) Inventors: Craig M. Smith; James E. Adams, Jr., both of Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/049,400

(22) Filed: Mar. 27, 1998

(51) Int. Cl.[7] .................................................. H04N 3/14
(52) U.S. Cl. ........................................ 348/272; 348/273
(58) Field of Search ................................ 348/272, 273, 348/274, 275, 231, 280, 220; 358/525; 382/162, 166, 299, 300

(56) References Cited

U.S. PATENT DOCUMENTS

| | | | |
|---|---|---|---|
| 3,971,065 A | 7/1976 | Bayer | 358/41 |
| 5,019,903 A | * 5/1991 | Dougall et al. | 348/448 |
| 5,053,861 A | * 10/1991 | Tsai et al. | 348/231 |
| 5,373,322 A | 12/1994 | Laroche et al. | 348/273 |
| 5,382,976 A | 1/1995 | Hibbard | 348/273 |
| 5,493,335 A | 2/1996 | Parulski et al. | 348/233 |
| 5,506,619 A | 4/1996 | Adams, Jr. | 348/272 |
| 5,596,367 A | * 1/1997 | Hamilton, Jr. et al. | 348/272 |
| 5,629,734 A | 5/1997 | Hamilton, Jr. | 348/222 |
| 5,652,621 A | * 7/1997 | Adams, Jr. et al. | 348/272 |
| 5,852,468 A | * 12/1998 | Okada | 348/272 |
| 6,091,851 A | * 7/2000 | Acharya | 348/272 |

* cited by examiner

Primary Examiner—Wendy R. Garber
Assistant Examiner—Luong Nguyen
(74) Attorney, Agent, or Firm—David M. Woods

(57) ABSTRACT

In a method for generating color image signals derived from an array of color image pixels, the array of color pixels are subsampled in order to generate an array of subsampled color pixels. An array of new, evenly spaced color pixels are interpolated from the subsampled color pixels using surrounding pixels of the same color, and the color image signals derived from the array of new color pixels are subsequently processed, e.g., in a color filter array interpolation. By providing this correction in a preprocessing step, the rest of the normal image processing hardware or software may be used on the resultant subsampled CFA image without developing the characteristic blocky and wavy artifacts caused by an irregular subsampling pattern.

11 Claims, 4 Drawing Sheets

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

FIG. 1
*(PRIOR ART)*

| G | R | – | – | G | R | – | – |
|---|---|---|---|---|---|---|---|
| B | G | – | – | B | G | – | – |
| – | – | – | – | – | – | – | – |
| – | – | – | – | – | – | – | – |
| G | R | – | – | G | R | – | – |
| B | G | – | – | B | G | – | – |
| – | – | – | – | – | – | – | – |
| – | – | – | – | – | – | – | – |

FIG. 2
*(PRIOR ART)*

CFA CORRECTION FOR CFA IMAGES CAPTURED AT PARTIAL RESOLUTION

FIELD OF THE INVENTION

The invention relates generally to the field of electronic photography, and in particular to a single sensor camera of the type that utilizes a color filter array.

BACKGROUND OF THE INVENTION

A typical digital camera uses a single color image sensor (e.g., a charge coupled device (CCD)) to capture a representation of a scene, including a representation of the color in the scene. These sensor devices typically comprise a two-dimensional array of photosite pixels that measure the light at each point on the array. To allow these sensors to capture a color image, a color filter array (CFA) is placed above the pixels so that each pixel measures the light of the color of its associated filter. One common CFA pattern is known as the Bayer RGB pattern. As shown in FIG. 1, the Bayer CFA (which is also described in U.S. Pat. No. 3,971,065) provides a pattern of red, green and blue filters, including a checkerboard arrangement of the green filters. Therefore, the primary CFA image signal for each pixel relates to but one color, that is, to either red, green or blue (for a Bayer CFA). After the CFA image is captured, the remaining (missing) colors for each pixel site are interpolated for each pixel from, e.g., surrounding pixels, so that a full resolution interpolated record is generated for each image. Each pixel in the interpolated record therefore has a set of RGB values.

In some digital cameras, it is necessary to capture images at a resolution that is lower than the normal resolution of the CCD sensor. One reason for this is the need to take a series of pictures quickly, such as a short low resolution video burst, with minimal memory and image processing time requirements. To accomplish this, the pixels in the CCD sensor are often subsampled. For example, U.S. Pat. No. 5,493,335 describes a variety of subsampling patterns, including one pattern based on 2×2 blocks of pixels. The CFA pattern in FIG. 2 shows how the pixels can be subsampled in 2×2 blocks at half resolution. In this pattern as shown in the figure, the R, G, and B pixels represent sampled red, green, and blue pixels, while the dashes represent pixels that are not stored. In this configuration, the valid pixels can be read from the CCD hardware much more quickly and stored in a smaller memory area. The time required to process the resulting image is also smaller.

However, the problem with this approach is that the resulting image quality is low because of the irregularly sampled pixels. It is common for images to appear slightly blocky and for edges to appear wavy because of the sampling pattern. It is desirable to find a method of correcting for this type of sampling as a preprocessing step while still using the rest of the normal image processing hardware or software.

SUMMARY OF THE INVENTION

The present invention is directed to overcoming one or more of the problems set forth above. Briefly summarized, according to one aspect of the present invention, a method for generating color image signals derived from an array of color image pixels comprises the steps of: subsampling the array of color pixels in order to generate an array of subsampled color pixels; interpolating an array of new, evenly spaced color pixels from the subsampled color pixels using surrounding pixels of the same color; and processing the color image signals derived from the array of new color pixels.

The advantage of this invention is that it corrects for the blocky and wavy artifacts caused by an irregular sampling pattern. Moreover, these artifacts can be corrected in a preprocessing step while still using the rest of the normal image processing hardware or software on the resultant subsampled CFA image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagram of a Bayer color filter array.

FIG. 2 is a diagram showing a subsampling pattern for a Bayer color filter array based on 2×2 blocks of pixels.

DETAILED DESCRIPTION OF THE INVENTION

Because digital cameras employing electronic sensors, and electronic processing and storage of the resultant image data, are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 3:
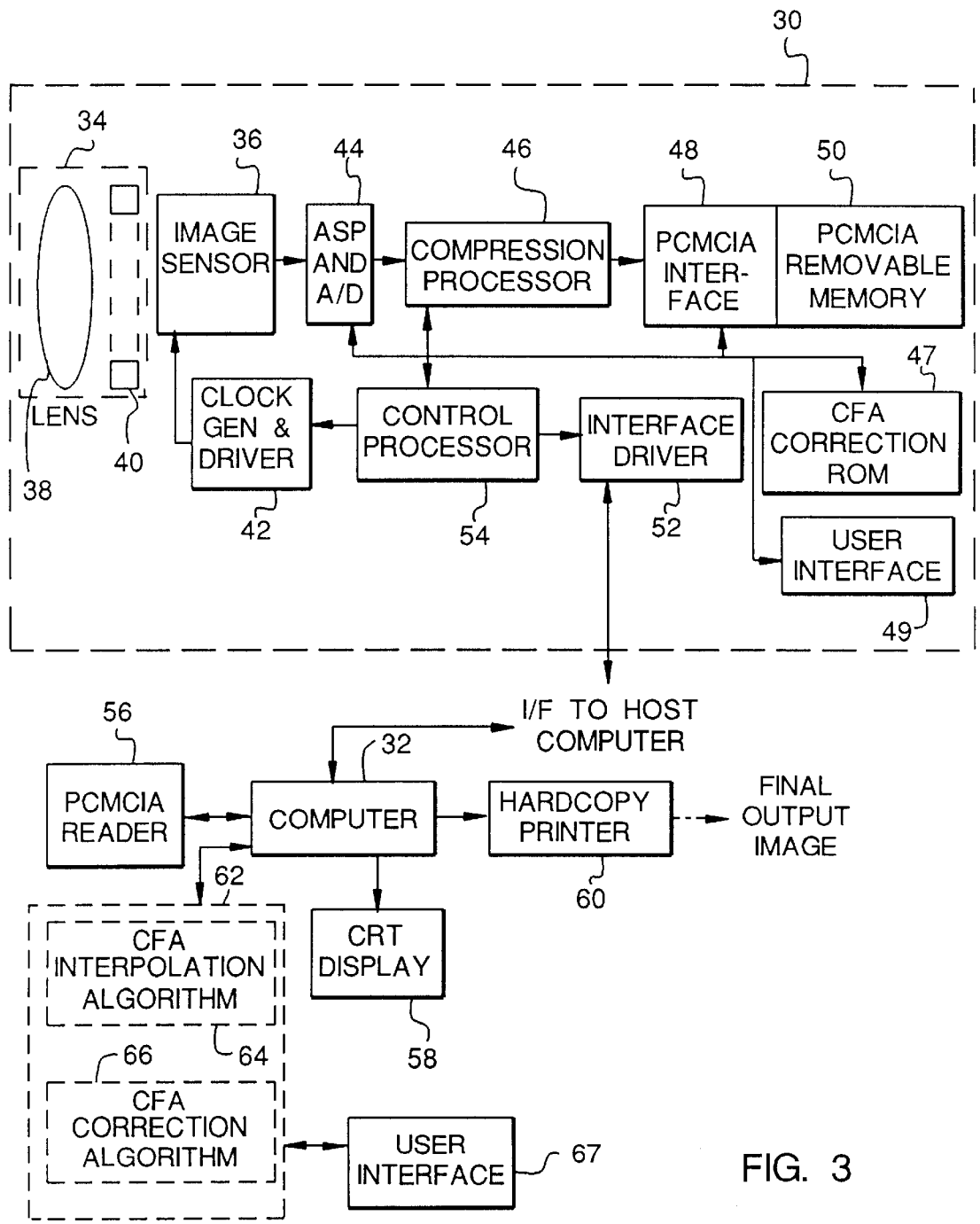
FIG. 3 is a block diagram of an imaging system incorporating CFA correction according to the invention.

Referring to FIG. 3, a block diagram of an imaging system incorporating CFA correction includes a camera 30 and a host computer 32. As will be explained, CFA correction can be performed in the camera 30 or in the computer 32, particularly where the camera is tethered to the computer. The camera 30 includes an optical section 34 for directing image light upon an image sensor 36, typically a single image sensor such as a charge-coupled device (CCD). The image sensor 36 includes an array of discrete light sensitive picture elements overlaid with a color filter array (CFA) pattern, such as the Bayer array shown in in FIG. 1, to produce color image data corresponding to the CFA pattern. The optical section includes a lens 38 and a shutter-aperture device 40 for regulating the exposure of the image light upon the image sensor 36. A clock generator and driver circuit 42 provides the waveforms necessary for generating the color image data from the image sensor 36, and the output data is applied to an analog signal processing (ASP) and analog/digital (A/D) conversion section 44, which produces digital CFA data from the color image data. The digital CFA data represents the "raw" CFA image data from the sensor 36, either from the full sensor or from a subsampled portion of the sensor.

The resultant digital data is applied to a digital signal processor 46, which may compress the image data using, e.g., any one of a number of compression techniques including JPEG compression or a numerically lossless or visually lossless compression technique employing DPCM coding, and otherwise process the image data for storage. More particularly, the digital signal processor 46 applies a CFA correction algorithm stored in a correction ROM 47 to the image data in certain situations. For instance, a user interface section 49 can be employed to instruct the camera to capture a burst of reduced resolution images, and to apply the CFA correction to these images. (In this embodiment, a removable memory 50 serves as a buffer for storing digital CFA data prior to processing, although a separate buffer could be provided.) The processed digital CFA data is applied to the removable memory 50 via an output interface 48. In operation, the CFA image data represents an image of a fixed resolution, usually an image substantially corresponding to the actual resolution of the image sensor 36. Consequently, the memory 50 stores the digital CFA image data from a fixed number of picture elements corresponding to this fixed resolution. However, in the aforementioned case of burst images, the digital CFA image data stored in the memory 50 may be a lower resolution rendition of the fixed resolution provided by the image sensor.

The output interface 48 is a memory card interface adapted to a conventional card interface standard, such as the PCMCIA card interface standard, such as described in the *PC Card Standard*, published by The Personal Computer Memory Card International Association, Sunnyvale, Calif., March 1997. The removable memory 50 accordingly is a non-volatile PCMCIA memory card containing either solid state memory, such as Flash EPROM memory, or a small hard drive (categorized as a PCMCIA-ATA Type III Hard Drive under the PCMCIA card interface standard). Another card interface standard is the CompactFlash ATA with DOS file format. Alternatively, other non-volatile storage devices may be used, such as a floppy disk magnetic medium or optical storage (in such cases, a suitable interface and a conventional read/write apparatus would be provided in the camera 30, e.g., a magnetic or optical read/write head).

In addition, the camera includes a host computer interface driver 52 for directly connecting the camera 30 to the host computer 32, for example, to download the digital CFA data corresponding to the captured images. (In this process, the removable memory 50 may serve as a buffer memory or a separate buffer memory (not shown) may be provided.) The camera 30 further includes a control processor 54 for controlling (a) the clock generator and driver circuit 42, (b) the digital signal processing chain comprising the ASP and A/D section 44, the digital signal processor 46, the output interface 48, and the user interface 49 and (c) the interface driver 52. The interface driver 52 provides a conventional computer interface, such as a SCSI or IEEE-1394 interface. Consequently, the digital CFA data from the camera 30 interfaces with the host computer 32 either through the interface driver 52, or through a card reader 56 that receives the removable memory 50.

In order to produce a processed image, the host computer 32 includes application programs for processing the captured images and producing a soft copy on a display 58 or a hard copy on a printer 60 (or, e.g., a film writer or the like). For example, the application programs include an algorithm section 62, which applies CFA interpolation 64 to the CFA data, and a user interface 67. The application programs interpolate full color data for each picture element from the CFA data and produce an interpolated output image. The CFA interpolation algorithm 64 may include any of a number of known interpolation techniques. For instance the interpolation techniques in the following patents may be used: U.S. Pat. No. 5,373,322, entitled "Apparatus and method for adaptively interpolating a full color image utilizing chroma gradients"; U.S. Pat. No. 5,382,976, entitled "Apparatus and method for adaptively interpolating a full color image utilizing image gradients"; and U.S. Pat. Nos. 5,506,619 and 5,629,734, both entitled "Adaptive color plan interpolation in a single sensor color electronic camera". Each of these patents is incorporated herein by reference. The processing algorithms may also apply noise reduction, white balance correction, color correction, edge enhancement, and the like. Alternatively, the camera 30 may include the CFA interpolation algorithm for interpolating the digital CFA data (as well as one or more of the processing algorithms that apply noise reduction, white balance correction, color correction, or edge enhancement) and, in that case, the camera 30 provides fully interpolated digital CFA data, making subsequent interpolation in the computer 32 unnecessary.

As mentioned before, the problem with use of the data that is subsampled as in FIG. 2 is that the resulting image quality is low because of the irregularly sampled pixels. It is common for images to appear slightly blocky and for edges to appear wavy because of the sampling pattern. Thus it is desirable to find a method of correcting for this type of sampling as a preprocessing step (before CFA interpolation) while still using the rest of the normal image processing hardware or software. According to the invention, the CFA correction is contained within the camera in the CFA correction ROM 47. Alternatively, a CFA correction algorithm 66 can be included in the algorithm section 62 of the computer 32 and the CFA correction can be applied to the CFA data in the computer before CFA interpolation.

Figure 4:
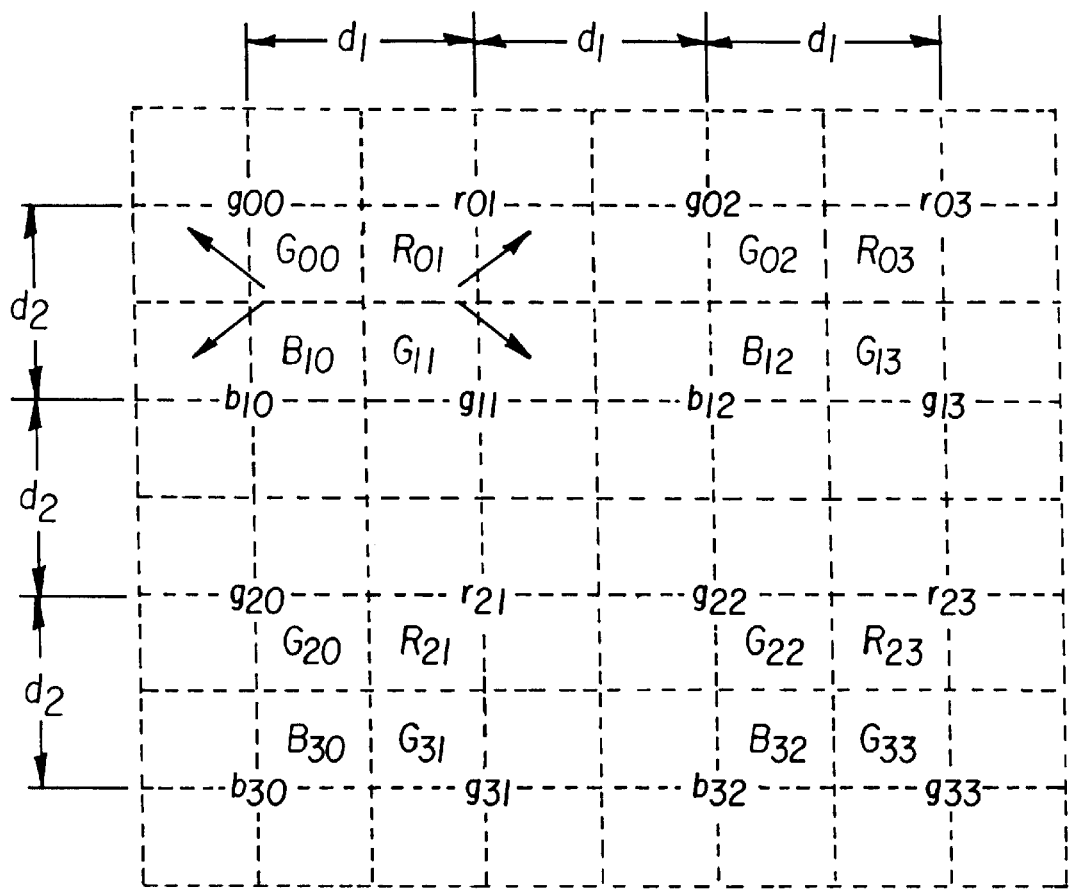
FIG. 4 is a diagram showing the spatial arrangement of interpolated pixels that have been CFA corrected according to the invention.

One method of correcting for this type of sampling artifact is to use surrounding pixels to interpolate a pixel at a location half a pixel diagonally away from the original pixels, as shown in the diagram in FIG. 4. In this diagram, the (large case) R, G and B pixels are the original sampled pixels, while the (small case) r, g, and b pixels are the interpolated pixels. It is important to note that the newly interpolated pixels are centered in a normal rectangular CFA type of pattern that produces a lower resolution version of the original CFA pattern. In particular, the newly interpolated pixels are evenly spaced across the image plane, that is, as shown in FIG. 4, evenly spaced by a distance $d_1$ in the row direction and a distance $d_2$ in the column direction (where $d_1$ does not necessarily equal $d_2$).

The new pixels can be generated by doing bilinear interpolation on the four pixels of the same color surrounding the new pixel. For example, new pixels $r_{21}$, $g_{11}$, $b_{12}$ and $g_{22}$ can be generated at half pixel spacing from the old pixels $R_{21}$, $G_{11}$, $B_{12}$, and $G_{22}$. More specifically, new pixel $r_{21}$ is bilinearly interpolated for the half pixel separation from the original data by using the following equation:

$$r_{21} = \frac{49R_{21} + 7R_{01} + 7R_{23} + R_{03}}{64}$$

To simplify the required computation, the interpolation can be approximated with the following equation:

$$r_{21} = \frac{6R_{21} + R_{01} + R_{23}}{8}$$

Similarly, the $g_{11}$, $b_{12}$, and $g_{22}$ pixels can be interpolated using the following equations:

$$g_{11} = \frac{6G_{11} + G_{31} + G_{13}}{8}$$

$$b_{12} = \frac{6B_{12} + B_{32} + B_{10}}{8}$$

$$g_{22} = \frac{6G_{22} + G_{02} + G_{20}}{8}$$

The other new pixels (small case r, g, b) in FIG. 4 are likewise bilinearly interpolated by reference to their surrounding neighbor pixels (large case R, G, B). When these equations have been applied to all the pixels in the subsampled image, a new subsampled CFA image is created comprising only the interpolated pixels at their half pixel spacing relative to the original pixels. This new subsampled CFA image can be processed into a complete RGB image using the same interpolation algorithms 64 as in the normal full resolution case. These interpolation algorithms are, as mentioned, well known in the art. While some aliasing will still occur because of the subsampling, the resulting image is significantly less blocky and wavy than it otherwise would have been.

Figure 5:
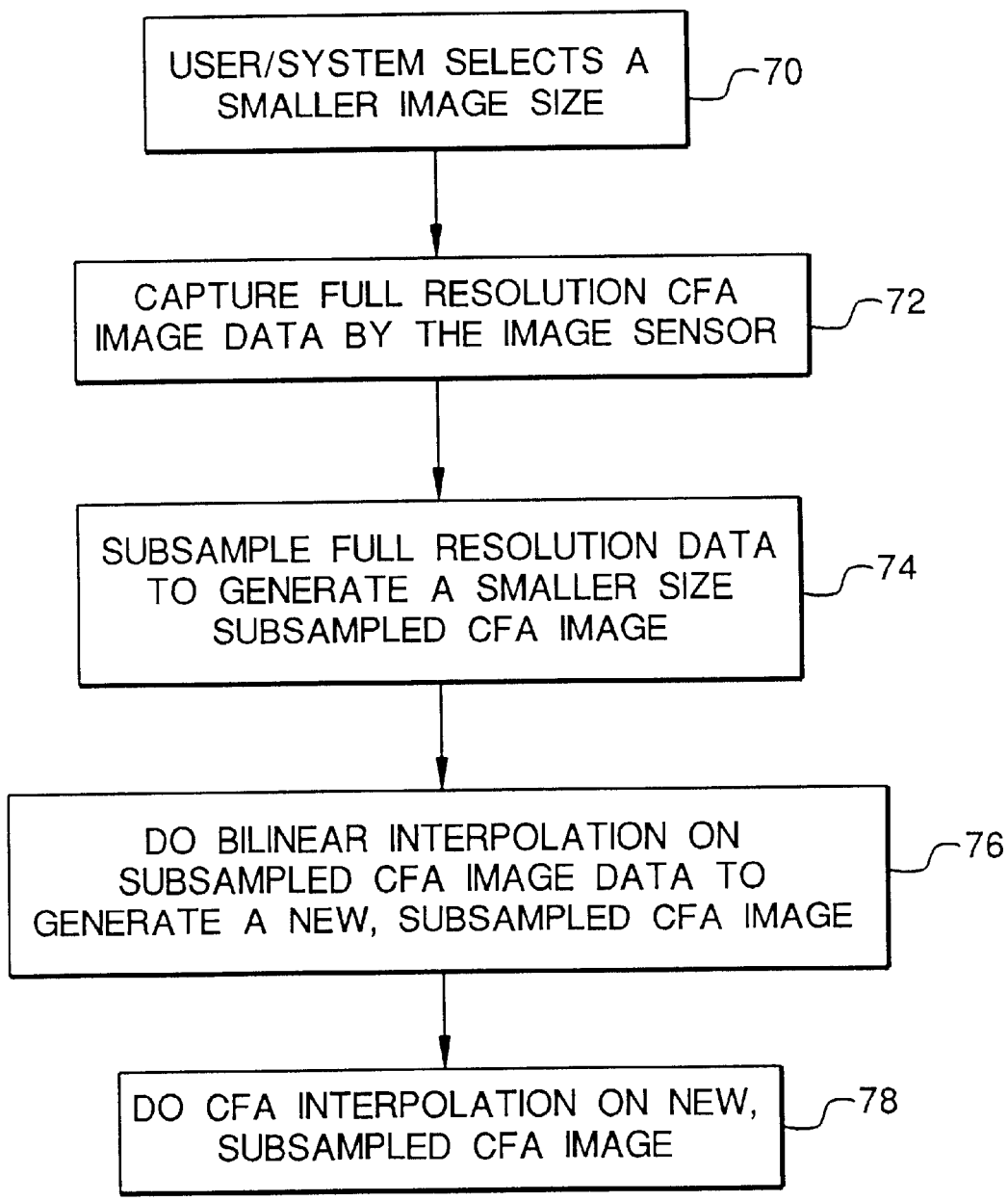
FIG. 5 is a flow diagram showing the CFA correction process according to the invention.

The overall steps of the CFA correction process are shown in FIG. 5. In the beginning, either the user or the imaging system selects a smaller image size (step 70). For example, the user may select a burst mode of operation, which triggers the system to select a smaller image size. Then, a full resolution CFA image is captured by the image sensor 36 (step 72). The full resolution CFA image data is then subsampled to generate a smaller size, subsampled CFA image (step 74). It is well known in the art to perform this subsampling, e.g., by reading only half of the pixel rows from the sensor 36. Since the other half of the pixel rows are not read from the sensor 36, this results in a significant speed increase while reading the sensor. (Alternatively, the CCD and processing hardware can be arranged so that the full resolution image is read from the sensor 36 and then stored in a buffer memory, which is then sampled according to the subsampling pattern. In that case, however, the speed advantage would be lost in readout of the sensor.) An example of a subsampled CFA image is shown in FIG. 2. Next, a bilinear interpolation is executed on the subsampled CFA image to generate a new subsampled CFA image (step 76). The new subsampled CFA image is shown by the small case r, g, b values in FIG. 4. Finally, processing is performed on the new CFA subsampled image (step 78). This processing could involve a single processing step, such as CFA interpolation, or an entire imaging chain including such steps as noise reduction, white balance correction, CFA interpolation, color correction, edge enhancement, and image compression.

It is important to note that all of the new pixels shown above were generated using the same type of equation. This means, after CFA interpolation of the separate colors, that the smoothing caused by the interpolation is the same in all three color planes. Because of this, the frequency characteristics of each of the three color planes is the same, which means that the subsequent image processing algorithms will not have extra color aliasing.

In some CFA sensors, there is a row-to-row mismatch of green pixels in the CFA pattern. This typically has to do with the readout electronics, where the green/red line has one set of gains, and the green/blue line has another set of gains, and the greens are therefore not completely balanced line to line. In other words, the green pixels in the green/red rows are slightly different from the green pixels in the green/blue rows. This is caused by the aforementioned interaction between consecutive pixels being read from the sensor. On a green/red row, the red pixels affect the green pixels in one way, while on a green/blue row, the blue pixels affect the green pixels in a different way. The resulting image can be much more noisy than it should be.

The algorithm described above can be modified to hide this row-to-row mismatch problem by using different pixels to interpolate the green pixels. If each original green pixel is averaged with the average of two other green pixels from the opposite row-type (i.e., odd row mixed with even row, and vice versa) the line-to-line offset is automatically canceled out, while at the same time creating a new interpolated green pixel at the desired location. The following equations show how this can be done.

$$g_{11} = \frac{2G_{11} + G_{20} + G_{02}}{4}$$

$$g_{22} = \frac{2G_{22} + G_{13} + G_{31}}{4}$$

It should be noted that while this eliminates the row-to-row mismatch problem without the need of an additional, much more complicated algorithm, it does mean that the interpolation blur in the green channel is slightly different than the interpolation blur in the red and blue channels. As a result, a very small amount of color aliasing becomes visible at certain frequencies in the resulting final image. In some resource constrained systems, this tradeoff is acceptable.

The invention has been described with reference to a preferred embodiment. However, it will be appreciated that variations and modifications can be effected by a person of ordinary skill in the art without departing from the scope of the invention.

Parts List 30 camera
32 host computer
34 optical section
36 image sensor
38 lens
40 shutter-aperture device
42 clock generator and driver circuit
44 ASP and A/D section
46 DSP
47 CFA correction ROM
48 output interface
49 user interface
50 removable memory
52 interface driver
54 control processor
56 card reader
58 display
60 hard copy printer
62 algorithm section
64 CFA interpolation algorithm
66 CFA correction algorithm
67 user interface
70–78 steps

What is claimed is:

1. A method for generating color image signals derived from an array of color image pixels, said method comprising the steps of:

subsampling the array of color pixels in order to generate an array of subsampled color pixels, the pixels of the array of subsampled color pixels being unevenly spaced in a row direction and a column direction;

interpolating an array of new, evenly spaced color pixels from the subsampled color pixels, the pixels of the array of new color pixels being evenly spaced in the row direction and the column direction, a given pixel of the array of new color pixels being interpolated using surrounding pixels, of the same color as the given pixel, in the array of subsampled color pixels; and processing the color image signals derived from the array of new color pixels.

2. A method as claimed in claim 1 wherein the step of interpolating comprises a bilinear interpolation.

3. A method for processing color image signals derived from an array of color image pixels arranged at a predetermined pixel spacing, said method comprising the steps of:

subsampling the array of color pixels in 2×2 blocks of color pixels at half resolution in order to generate an array of subsampled color pixels, the pixels of the array of subsampled color pixels being unevenly spaced in a row direction and a column direction;

interpolating an array of new color pixels at half pixel spacing from the subsampled color pixels, the pixels of the array of new color pixels being evenly spaced in the row direction and the column direction, a given pixel of the array of new color pixels being interpolated using surrounding pixels, of the same color as the given pixel, in the array of subsampled color pixels; and processing the color image signals derived from the array of new color pixels.

4. A method as claimed in claim 3 wherein the step of interpolating comprises a bilinear interpolation.

5. A method as claimed in claim 4 wherein the bilinear interpolation is weighted to produce half pixel spacing.

6. A method for processing color image signals derived from an array of color image pixels arranged at a predetermined pixel spacing, said method comprising the steps of:

capturing a color image through a color filter array to generate a corresponding array of color pixels;

subsampling the array of color pixels in 2×2 blocks of color pixels at half resolution in order to generate an array of subsampled color pixels, the pixels of the array of subsampled color pixels being unevenly spaced in a row direction and a column direction;

interpolating an array of new color pixels at half pixel spacing from the subsampled color pixels, the pixels of the array of new color pixels being evenly spaced in the row direction and the column direction, a given pixel of the array of new color pixels being interpolated using surrounding pixels, of the same color as the given pixel, in the array of subsampled color pixels; and processing the color image signals derived from the array of new color pixels.

7. A method as claimed in claim 6 wherein the step of interpolating comprises a bilinear interpolation.

8. A method as claimed in claim 7 wherein the bilinear interpolation is weighted to produce half pixel spacing.

9. A method as claimed in claim 6 wherein the color filter array is a Bayer color filter array.

10. A method as claimed in claim 6 wherein the step of processing comprises a color filter array interpolation.

11. A method as claimed in claim 6 wherein the step of processing includes one or more processing steps selected from the group consisting of noise reduction, white balance correction, color filter array interpolation, color correction, edge enhancement, and image compression.

* * * * *